United States Patent
Mosley

(10) Patent No.: US 6,173,606 B1
(45) Date of Patent: Jan. 16, 2001

(54) LOGGING TOOL FOR CEMENT EVALUATION

(75) Inventor: Demmie L. Mosley, Amarillo, TX (US)

(73) Assignee: Titan Specialties, Ltd., Pampa, TX (US)

( * ) Notice: Under 35 U.S.C. 154(b), the term of this patent shall be extended for 0 days.

(21) Appl. No.: 09/262,948

(22) Filed: Mar. 4, 1999

(51) Int. Cl.[7] .............................. G01N 5/00; G06F 15/20
(52) U.S. Cl. ...................... 73/152.16; 73/152.51; 73/588; 73/600; 166/253; 166/1
(58) Field of Search ............................. 73/152.16, 152.14, 73/152.57, 152.58, 582, 588, 600; 166/253.1, 254.2; 175/40–41

(56) References Cited

U.S. PATENT DOCUMENTS

| | | | | |
|---|---|---|---|---|
| 2,532,536 | * | 12/1950 | Boucher | 250/65 |
| 2,580,544 | * | 1/1952 | Herrog | 250/83.6 |
| 3,127,950 | * | 4/1964 | Itria | 181/0.5 |
| 3,291,247 | * | 12/1966 | Majani et al. | 181/0.5 |
| 3,304,538 | * | 2/1967 | Zill | 340/18 |
| 3,358,788 | * | 12/1967 | Wilson | 181/0.5 |
| 3,752,257 | * | 8/1973 | Davis | 181/0.5 |
| 5,272,629 | * | 12/1993 | Hall | 364/422 |
| 5,390,115 | * | 2/1995 | Case et al. | 364/422 |

* cited by examiner

Primary Examiner—Hezron Williams
Assistant Examiner—David J. Wiggins
(74) Attorney, Agent, or Firm—Klein & Szekeres, LLP

(57) ABSTRACT

A γ-ray tool and acoustic logging instrument combination includes in an elongated housing a transmitter for sound and at least one and preferably two, sound sensors located at predetermined distances above the transmitter. The sound sensors are separated from the sound transmitter by a steel tube that has a layer of lead bonded onto its exterior surface and has electronic components of the instrument placed into its interior. The portion of the housing that surrounds the lead bonded steel tube consists of fiberglass, polytetrafluoroethylene (TEFLON®) or other material which does not conduct sound whereby the lead-bonded tube and the immediate housing around it act as a sound isolator bar. The transmitter and the sound sensors are surrounded by portions of the housing that comprises slotted steel to allow free flow of acoustic energy through these portions of the housing. The γ-ray detector is enclosed in the housing, preferably above the sound sensors at a portion of the steel pipe not having a layer of lead around its circumference. Because of the placement of electronic components into the interior of the isolator bar and through the sensors and transducers themselves, the overall length of the instrument is reduced to approximately 8½ feet or less not including the length of a centralizer nor of a case collar locator that is usually attached to the instrument combination.

20 Claims, 3 Drawing Sheets

LOGGING TOOL FOR CEMENT EVALUATION

BACKGROUND OF THE INVENTION

1. Field of the Invention

The present invention is in the field of logging instruments for evaluation of cement bonding to pipe casings in downhole formations. More particularly, the present invention is directed to improved acoustic logging instruments for evaluation of cement bonding to pipe casings and also in open holes in downhole formations.

2. Brief Description of the Prior Art

A pipe casing in a downhole formation utilized for the production of oil, gas steam or other minerals is typically surrounded by a layer of cement that ideally should be tightly bonded to the metal casing. The integrity of the bond between the metal casing is of such importance that instruments or "tools" have been developed in the prior art to measure the integrity or quality of the casing-metal-to-cement bond and to create a "log" of the corresponding data along the length of the pipe casing.

The best known instruments utilized for the above-noted purpose operate on acoustic principles. More particularly, the acoustic instrument utilized for this purpose includes a sound emitting transducer and a plurality (usually two) sound sensors positioned at predetermined distances (usually at 3 and 5 feet) above the transducer. The instrument is lowered into the borehole on a wireline, centered within the casing by means that are usual for centering downhole instruments in a pipe and the transducer is activated by electrical energy supplied to it through the wireline. Sound waves (acoustic energy) generated by the transducer travel through several paths to the two sensors located in the instrument above the transducers. One eminent path of the sounds is through the liquid (water or drilling mud) that usually fills the pipe casing at this stage of the downhole operation or exploration, another paths is through the metal casing, still another through the formation, and yet another through the body of the instrument itself. The basic principle behind using acoustic energy to collect data on the integrity of cement bonding to the casing is that cement bonded tightly to the metal casing significantly attenuates the sound energy that is conducted through the pipe, much the same as a steel tube held tightly in a vise "rings" significantly less when struck by a hammer than a free standing steel tube. Thus, it is important for the instrumentation that receives data from the sensors to identify the acoustic energy that reaches the sensor(s) through the casing, and distinguish it from acoustic energy that has traveled to the sensor(s) through other routes.

Generally speaking sound waves (acoustic energy) travel through aqueous fluid at the speed of approximately 180 to 220 $\mu$sec/foot, through steel at approximately 57 $\mu$sec/foot and in the formation at the speed of approximately 45 to 200 $\mu$sec/foot. Based on these different speeds an instrument that receives input from the sensors that measure the timing of the sound waves' arrival as well as their intensity (amplitude) can usually differentiate on the basis of the timing of their arrivals (and other factors) among the sound waves that have traveled from the transducer to the sensor(s) through the liquid inside the casing, the steel pipe and the formation. However, it was found in practice that the sound waves traveling through the metal body of the instrument itself are difficult to distinguish from the sound waves (acoustic energy) that reaches the sensor(s) through the metal casing. Moreover the acoustic energy transmitted through the body of the instrument carries no useful information regarding the formation nor about the integrity of the cement bonding to the casing.

The prior art has coped with the just-described problem in various ways. One method of solution utilized in the prior art is to place a lead-filled pipe section as part of the body of the instrument, that is separating the sound emitting transducer of the instrument from the sensors by a lead-filled pipe section that acts as an "isolator bar". However it was found that such an isolator bar functions to block (or significantly reduce) the transmission of sound energy through it only when the lead filling is tightly bound to the interior walls of the pipe. This bonding deteriorates with repeated exposure of the instrument to the high pressures downhole coupled with repeated returns to atmospheric pressure on the surface. Another method of solution in accordance with the state-of-the-art is to externally coat a steel pipe or bar with lead, and use that as an isolator bar between the transducer and sensors. Still another method is to provide an isolator bar that comprises a highly slotted steel body so that the sound waves traveling through it must travel through multiple and extended paths whereby they arrive later than they would through an ordinary pipe section, and tend to cancel each other due to interference.

Although each of the solutions described above has been found workable, neither of them is ideal. One significant problem associated with the use of acoustic instruments of the type described above concerns the utilization of space. As is well known, in the highly confined environment of downhole instrumentation space available for packaging of components must be utilized well. In other words, electronic and other equipment must be packed as tightly as possible within the relatively narrow, usually cylindrical interior of the instruments. Moreover, the one method of providing more space by extending the overall length of the instrument is practiced, but is not preferred in the art. The use of a lead-filled tube as an isolator bar as practiced in the prior art does not permit the placing of components along the length of the bar, and therefore undesirably extends the overall length of the instrument. This is particularly disadvantageous because it is customary in the art to combine the use of the acoustic logging tool with a $\gamma$-ray tool that measures $\gamma$-ray radiation of the formation along the length of the pipe casing. In state-of-the-art instruments the $\gamma$-ray tools are usually coupled to, that is are physically attached to the acoustic logging tool, below the acoustic tool. Usual length of state-of-the-art acoustic logging tools is approximately 9 to 10 feet, and the usual length of state-of-the-art $\gamma$-ray tools is approximately 4 feet, thus adding up to an overall length of approximately 13 to 14 feet for the acoustic logging tool and $\gamma$-ray tool combination, not including the length of the usually appended centralizer and casing collar locator. The present invention allows significantly better utilization of space and provides a significantly shorter combination of the acoustic logging and $\gamma$-ray tools.

OBJECTS AND SUMMARY OF THE INVENTION

It is an object of the present invention to provide an acoustic logging instrument wherein the interior space is well utilized for inclusion of the several component parts of the instrument.

It is another object of the present invention to provide an acoustic logging instrument in combination with a $\gamma$-ray tool that has a significantly shorter overall length than state-of-the-art acoustic logging and $\gamma$-ray instrument combinations.

It is still another object of the present invention to provide an acoustic logging instrument in combination with a γ-ray tool wherein the components of the γ-ray tool are contained within the same housing as components of the acoustic logging tool.

The foregoing and other objects and advantages are attained by an instrument that includes in an elongated housing a transmitter for sound and at least one, preferably two, sound sensors located at predetermined distances above the transmitter. The sensors are separated from the transmitter by a steel tube that has a layer of lead bonded onto its exterior surface and has electronic components of the instrument placed into its interior. The portion of the housing that surrounds the lead bonded steel tube consists of fiberglass, polytetrafluoroethylene (TEFLON®) or other material which does not conduct sound whereby the lead-bonded tube and the immediate housing around it act as a sound isolator bar. The transmitter and the sensors are surrounded by portions of the housing that comprises slotted steel to allow free flow of acoustic energy through these portions of the housing. A γ-ray detector is enclosed in the housing, preferably above the sensors. Because of the placement of electronic components into the interior of the isolator bar and through the sensors and transducers themselves, the overall length of the instrument is substantially reduced.

The features of the present invention can be best understood together with further objects and advantages by reference to the following description, taken in connection with the accompanying drawings, wherein like numerals indicate like parts.

DETAILED DESCRIPTION OF THE PREFERRED EMBODIMENT

The following specification taken in conjunction with the drawings sets forth the preferred embodiment of the present invention. The embodiment of the invention disclosed herein is the best mode contemplated by the inventor for carrying out his invention in a commercial environment, although it should be understood that various modifications can be accomplished within the parameters of the present invention.

Figure 1:
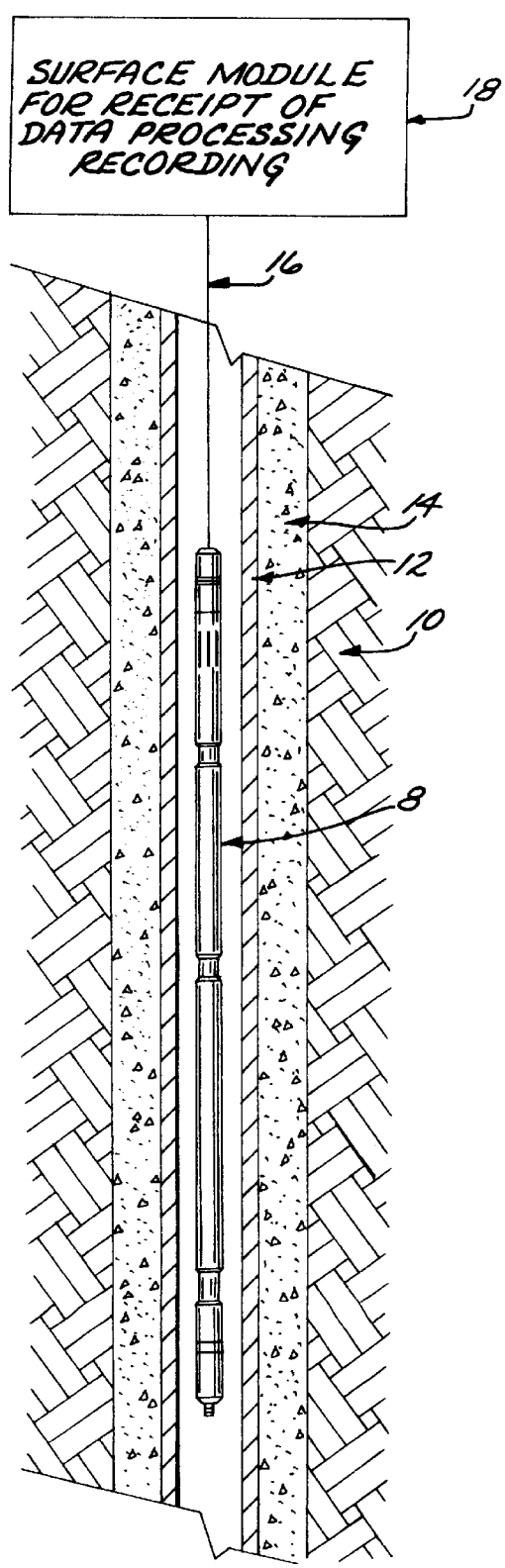
FIG. 1 is an overall schematic view of the combination acoustic logging instrument and γ-ray detector of the present invention, showing the instrument in a downhole formation.
Figure 2:
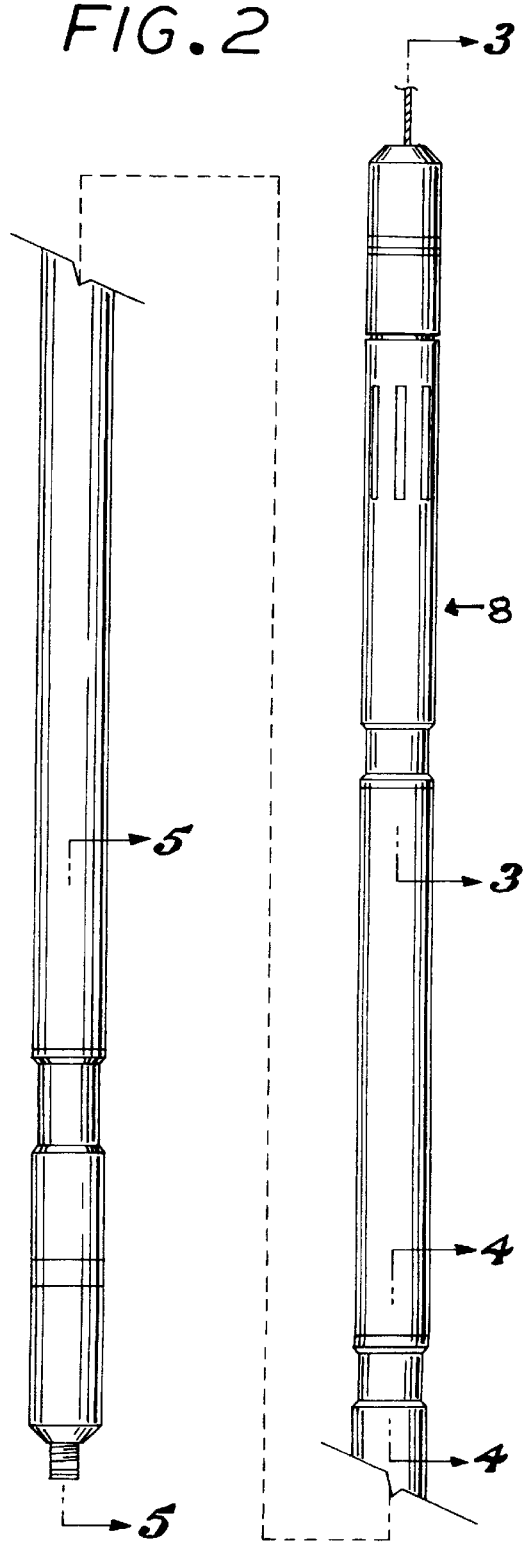
FIG. 2 is a plan view of the instrument.

Referring now to the drawing figures and particularly to FIG. 1, the combination acoustic logging instrument and γ-ray detector 8 of the present invention is schematically shown in the environment in which it is used. As it was noted in the introductory section of the present application for patent, acoustic logging instruments and γ-ray detectors are used for obtaining information (data) from a borehole made in a formation 10 in connection with exploration or production of oil, gas, steam or other minerals. The borehole is usually equipped with a casing 12 that comprises a plurality of steel tube sections threaded to one another and placed into the borehole. For production of oil, gas, or steam the casing is surrounded by a layer of cement 14 that is bonded to the casing 12. As it is noted in the introductory section of the present application for patent, an important purpose of the acoustic logging instrument of the present invention, as well as of the acoustic logging instruments of the state-of-the-art, is to measure and log information pertaining to the tightness of the bonding of the cement 14 to the pipe casing 12. In spite of this, however, the acoustic logging instrument or tool of the present invention by itself, or in combination with the γ-ray tool, can also be used in open holes in formations.

Inasmuch as several components of the acoustic logging instrument, of the γ-ray tool and associated equipment are conventional, the conventional parts or components are identified and in certain cases described here only to the extent necessary to describe the present invention. The combined acoustic logging instrument or tool and γ-ray tool are held in the casing 12, and prevented from falling in further by a wireline 16 that includes an electrical cable connecting the instrument with equipment on the surface. The equipment on the surface is schematically shown in FIG. 1 as a "surface module" 18. Those skilled in the art should understand that the term "surface module" in the description of the present invention includes electronic and associated equipment that receives data from sensors in the acoustic logging instrument or tool and preferably from γ-ray tool as well, processes the data in accordance with predefined algorithms, displays and optionally stores the data as well. The display of the data usually takes the form of a logging chart that is well known by those skilled in the trade. It will also be understood by those skilled in the art, that processing, storing and displaying the data on a computer screen, by printing a log or chart or otherwise, do not need to occur at a site in the close proximity of the borehole, and can occur at a remote location. The instruments and algorithms used for processing the data obtained from the acoustic logging tool and also from the γ-ray tool per se are known in the art, and need not be described here.

Figure 3:
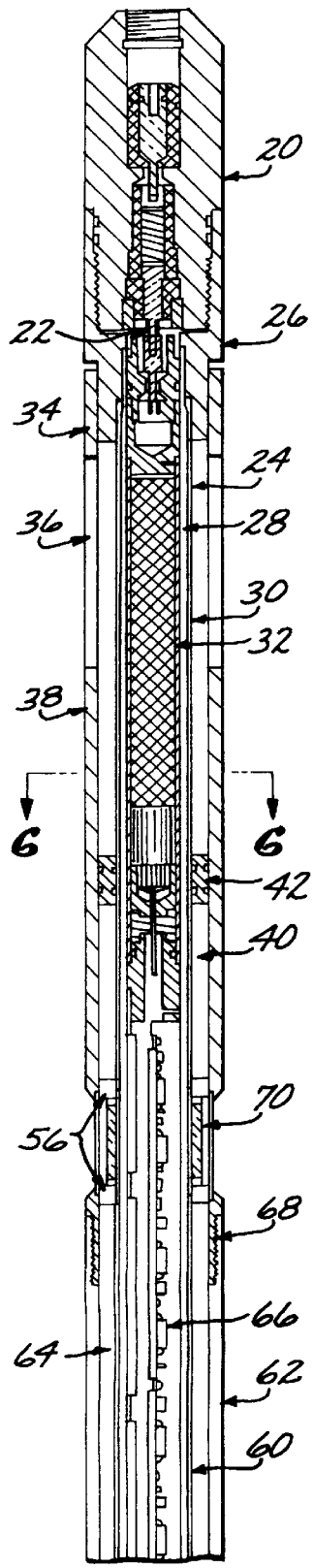
FIG. 3 is a cross-sectional view, the cross-section being taken on lines 3,3 of FIG. 2.
Figure 4:
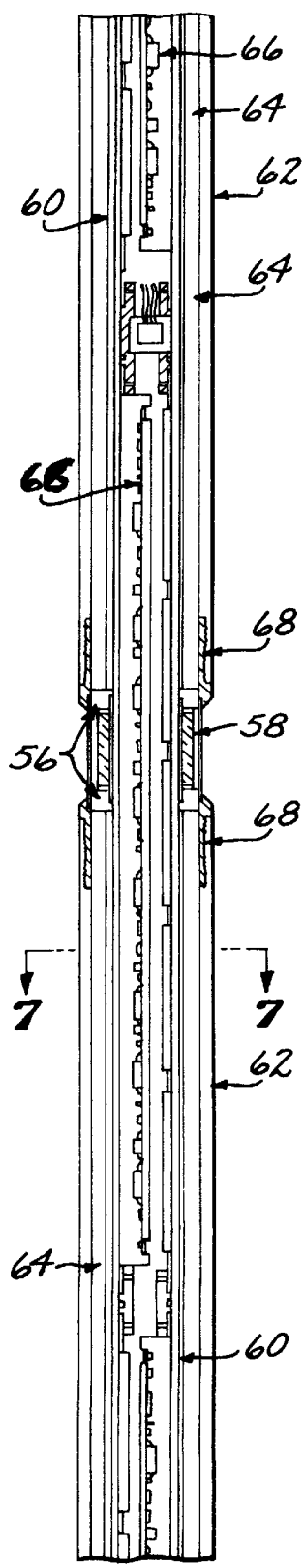
FIG. 4 is a cross-sectional view, the cross-section being taken on lines 4,4 of FIG. 2.
Figure 5:
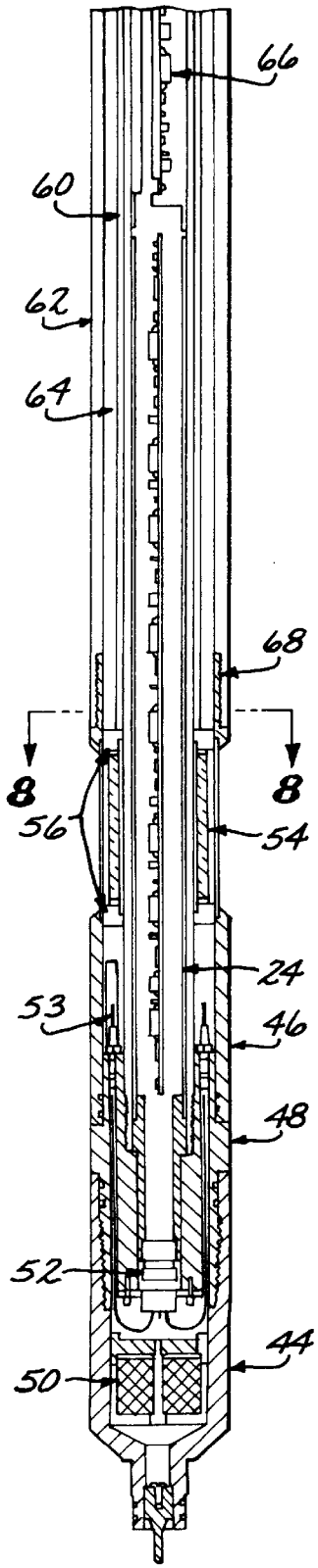
FIG. 5 is a cross-sectional view, the cross-section being taken on lines 5,5 of FIG. 2.
Figure 8:
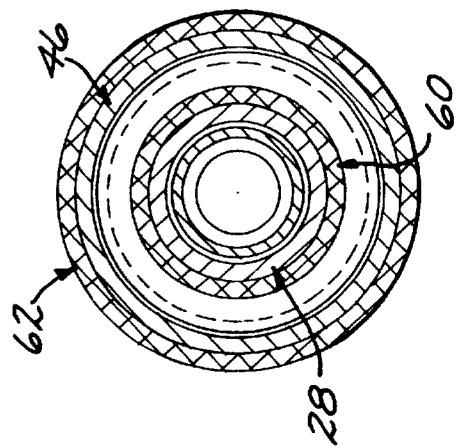
FIG. 8 is a cross-sectional view taken on lines 8,8 of FIG. 5.
Figure 7:
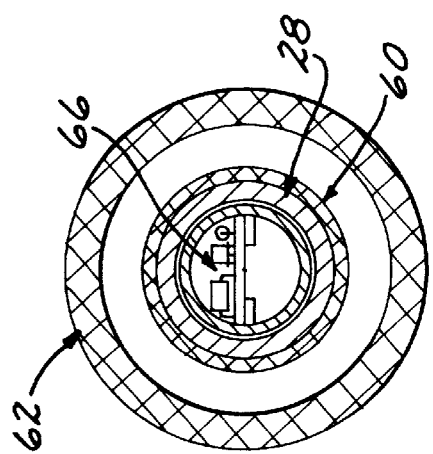
FIG. 7 is a cross-sectional view taken on lines 7,7 of FIG. 4.
Figure 6:
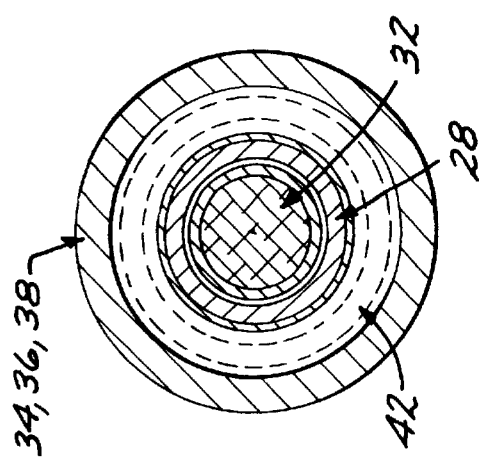
FIG. 6 is a cross-sectional view taken on lines 6,6 of FIG. 3.

Referring now primarily to the cross-sectional views of FIGS. 3–5, the presently preferred embodiment of the combination acoustic logging instrument or tool and γ-ray tool of the present invention is disclosed. It should be understood that in the description of this invention the terms "instrument" and "tool" are used interchangeably unless the text requires or the context indicates otherwise. Thus, beginning with the description of the top of the instrument shown in FIG. 3, as the instrument would normally be placed in a casing 12 in a borehole, it includes a top sub-assembly 20 that itself includes a top electrical connector 22 that is electrically connected to and is supplied with power from the surface through the wireline 16. The top sub-assembly 20 is attached to the metal inner housing 24 immediately below with a top sub adapter 26. The top sub assembly 20 electrical connector 22 and top sub-adapter 26 per se are conventional and are assembled to one another by threaded connections, or are bolted together, in accordance with the state-of-the-art. The instrument of the present invention is of a tubular overall configuration because of the tubular shape of the several housing components, and of a diameter which fits within the well casing. Well casings vary in diameter, and accordingly the instruments which may be constructed in accordance with the present invention are limited in diameter only in the sense that they must fit into the well casing in which they are intended to be used. It should be understood that the specific dimensions, especially diameters, that are provided below for certain component parts of the instrument of the present invention, are exemplary only and are provided for the purpose of accurately describing the presently preferred embodiment and not to limit the invention.

The inner housing 24 in this specific embodiment is a carbon steel tube 28 enclosed in a stainless steel sleeve 30 jointly having an outer diameter (O. D.) of 1.375 inches and an inner diameter (I. D.) of 1.10 inches. A γ-ray detector tool 32 is positioned inside the inner housing 24 below the top-sub adapter 26 and is supplied with electrical power through the top electrical connector 22. As is well known, and is described briefly above, the γ-ray detector 32 measures the intensity of γ radiation that emanates from the formation surrounding the instrument and provides data to the surface module 18. With regard to the principle of operation and operating parts thereof the γ-ray detector 32 is conventional. However, its position in the housing 24 and its relation to the acoustic logging instrument (detailed below) is novel and represents a feature of the present invention. The γ-ray detector 32 itself is available commercially and can be a Geiger tube or a scintillation crystal/photo multiplier tube. The model incorporated into the overall instrument of the present invention is available from Titan Specialties Inc. Pampa, Tex. Above the γ-ray detector 32 is an outer housing section which at its upper part 34 comprises steel and is attached to the top sub-adapter 26. The next section 36 of the outer housing however comprises slotted steel material that is significantly more transparent to γ-radiation than solid steel. This is necessary, or highly desirable in order to expose the γ-ray detector to the natural radiation of the surrounding formation 10 and to obtain a meaningful measurement. Below the slotted steel section 36 the next section 38 of the outer housing again comprises solid steel. Space 40 between the outer housing and the γ-ray detector 32 is filled with silicon oil, and above the oil-filled space 40 is located a conventional pressure compensating piston assembly 42. The pressure compensation is necessary because liquid from the environment can enter trough the slotted steel section 36.

Referring now to FIG. 5 on the bottom of the combination acoustic logging instrument and γ-ray detector 8 of the present invention a bottom sub-assembly 44 is shown attached by a bottom sub-adapter 48 to a steel outer housing section 46 and to the interior carbon steel—stainless steel housing combination 24. A transformer 50, a bottom electrical connector 52 and high pressure electric feed through connections 53 are enclosed in the bottom sub-assembly 44. The transformer 50 serves the purpose of providing electric power of the appropriate voltage to actuate an acoustic transmitter 54 which is located above the steel outer housing section 46 and is mounted to the inner housing 24 by retainer clamps and shock cushions 56.

The hitherto described bottom sub-assembly 44, bottom sub-adapter 48, transformer 50, electrical connector 52, high pressure electric feed through connections 53 and retainer clamps and shock cushions 56 are also conventional, made and used in accordance with the state-of-the-art and need not be described here further. The acoustic transmitter 54 per se is also conventional; model C5500-2.0-.2-3.0 used in the presently preferred embodiment can be obtained from Channel Industries Inc., Santa Barbara, Calif. As is known, state-of-the art acoustic transmitters operate on piezoelectric principles, that is an electric impulse provided to the material of the transmitter causes vibration of the quartz crystal in the transmitter which outputs a burst of acoustic energy into the transmitter's environment. In some state-of-the-art instruments magnetorestrictive transmitters or transducers are used and the present invention is not limited by the type of acoustic transmitter or transducer being used. As is shown in FIG. 5, the piezoelectric transmitter 54 surrounds the interior housing 24 in the form of a sleeve, but the steel outer housing section 46 is terminated below the transmitter 54. As a consequence, the transmitter 54 is in direct contact with the liquid that fills the casing 12 whereby the acoustic energy generated by the transmitter 54 is directly transferred to its environment. This, per se is also conventional in the state-of-the-art.

Referring now to FIG. 4, a first acoustic sensor or receiver 58 is located above the transmitter 54 mounted to the inner housing 24 by retainer clamps and shock cushions 56. The acoustic sensor or receiver per se is again well known in the art. The model C5500-2.0-.2-1.5 incorporated in the presently preferred embodiment can also be obtained from Channel Industries Inc. In the presently preferred embodiment of the instrument 8 of the present invention the first sensor or receiver 58 is placed at a distance of three (3) feet above the transmitter 54, as is customary in the art. It should be understood however that the present invention is not limited by the precise distance between the transmitter 54 and the sensor 58 or between the transmitter 54 a second sensor described below. The algorithm that is used for creating a "log" from the data gathered and transmitted by the instrument 8 to the surface module 18, of course, takes the distances between the transmitter 54 and the sensors into consideration.

As an important novel feature of the present invention the interior steel housing 24 that is situated above the transmitter 54 is surrounded by a sleeve of tightly bonded lead 60 throughout the entire distance between the transmitter 54 and the first sensor or receiver 58. The tightly bonded lead sleeve 60 on the inner housing 24 acts as an isolator bar and prevents the steel pipe of the inner housing 24 from conducting acoustic energy from the transmitter 54 to the receiver or sensor 58. In the herein described preferred embodiment the layer of lead 60 on the steel housing 24 is approximately 0.125 inches thick so that the outer diameter of the lead-covered steel tube of the interior housing is approximately 1.375 inches. A tubular fiberglass exterior housing 62 surrounds the lead-covered section of the interior housing between the transmitter 54 and the first sensor or receiver 58. The annular space 64 between the fiberglass exterior housing 62 and the lead-covered steel housing is approximately 0.4 inches wide in the herein described preferred embodiment. It is filled with silicon oil.

The purpose of the fiberglass exterior housing 62 is to protect the lead-covered steel isolator bar from the exterior environment, and to act as a sound isolator and insulator. This is possible because fiberglass does not conduct or transmit sound. Other materials that do not transmit or conduct sound, such as polytetrafluoroethylene (TEFLON®), could also be used instead of fiberglass for the exterior housing of the lead-covered sound isolator bar. A requirement for the material from which the exterior housing 62 can be made is, of course, that in addition to be a very poor conductor of sound, it must be able to withstand the harsh conditions of the downhole environment. It will be readily understood in this connection by those skilled in the art that neither fiberglass, nor polytetrafluoroethylene (TEFLON®), nor any other material acts as perfect isolator or non/conductor of sound. However, for the practical purposes of the present invention the acoustic energy conducted by the fiberglass, polytetrafluoroethylene or like material is negligible. In the herein described preferred embodiment the outer diameter of the fiberglass housing is 2.75 inches and the inner diameter is 2.25 inches.

It is another important feature of the present invention that the lead-covered section of the interior steel housing provides space wherein electronic components of the acoustic instrument can be placed. As is known in the art, the electronic components of the acoustic tool include circuit boards, microchips, transistors, and other electronic components. Because these components per se are known in the art, they need not be described here and a single reference numeral 66 designates the electronic components in the appended drawings without distinction to their precise nature, such as circuit board, microchip or the like. Whereas the electronic components of the acoustic tool per se are standard in the art, their placement within the interior of the lead-covered interior steel housing and through the transmitter and receivers is novel, and represents an important feature of the present invention. This feature makes possible such efficient utilization of space that the overall length of the combination 8 acoustic instrument and γ-ray tool of the present invention is significantly reduced, from the usual 13 to 14 feet of the cumulative length of these two tools in the prior art (not including centralizer and casing collar locator) to approximately 8.5 feet in accordance with the present invention, again not including centralizer and casing collar locator.

As is shown in FIG. 4, the fiberglass exterior housing 62 terminates just below the first acoustic sensor or receiver 58, where it is threaded to a steel outer housing section 68. The acoustic sensor 58 is mounted on the steel inner housing 24 but is not surrounded by an external housing and therefore it can receive acoustic energy directly from its environment. Electronic components 66 are packed within the interior housing 24 even where the receiver 58 is located, just like they are packed within the interior housing 24 where the transmitter 54 is located. Another steel exterior housing section 68 is located above the receiver 58 to which again a fiberglass exterior housing 62 is mounted by threading. The fiberglass exterior housing 62 extends in the herein described preferred embodiment for a length of approximately two feet up to the second acoustic receiver or sensor 70 below which the fiberglass housing is mounted on a tubular steel section 68. The interior steel housing 24 is provided with a sleeve of tightly bound lead 60 so that it and the fiberglass exterior housing 62 act as insulators or breakers for the transmission of sound. The annular space 64 between the lead-covered interior steel housing 24 and the fiberglass exterior housing 62 is filled with silicon oil for sound insulation. The interior of the lead-covered steel housing 24 between the first 58 and second receivers 70 as well as where the second receiver 70 is, provides more space for mounting electronic components, as is shown in FIGS. 3 and 4. Similarly to the first acoustic receiver or sensor 58, the second acoustic receiver 70 is also mounted on the external surface of the interior steel housing 24, and is not surrounded by an exterior housing and therefore it receives acoustic energy directly from its environment.

The principles of operation of the combination acoustic and γ-ray instrument should be readily apparent to those skilled in the art from the foregoing description, including description of the background art coupled with what is known within the state-of-the-art. Briefly stated, the combination instrument 8 is centralized within the casing 12 and the instrument is slowly moved within the casing while the acoustic transmitter 54 is energized approximately 20 times per second. The two sensors 58 and 70 receive acoustic energy and transmit data to the surface module 18 where the data are processed to provide useful information that is displayed usually in the form of a log or chart. However, the novel features and advantages of the present invention lie not in the nature and operation of the electronic components of the acoustic and γ-ray tools. Rather, the novel features include the provision of the lead-covered steel acoustic isolator bar combined with a fiberglass (or like) sound insulating exterior housing, the location and mounting of electronic components within the instrument and particularly within the interior of the lead covered steel isolator bar and in the inner housing at the locations where the transmitter 54 and acoustic sensors 58 and 70 are. The combination of these features and their positioning relative to one another in accordance with the present invention makes it possible to provide a combination of acoustic and γ-ray instrument which is significantly shorter than the cumulative length of these two instruments in the prior art. The combination acoustic and γ-ray instrument of the invention can be used not only in bore holes provided with a cemented-in casing for the purpose of measuring the integrity of the casing, but also in open holes in formations where the acoustic properties of the formation are probed and logged. The combination acoustic and γ-ray instrument of the invention can also be adapted, within the scope of the invention, to be used in a directional acoustic device that is commonly known in the art as a "radial bond" or "segmented bond" acoustic tool. Still further, the generic concepts and novel features of the present invention can also be adapted to provide combination logging tool and γ-ray instruments which have more than one acoustic transmitter and or more than two acoustic sensors. Whereas the overall length of such instruments having more than one transmitter and or more than one sensors is likely to exceed approximately 8½ feet, such instruments constructed in accordance with the present invention are nevertheless significantly shorter than like instruments of the prior art.

It should be understood that while the preferred embodiment of the invention has been shown and described, modifications may be become readily apparent to those skilled in the art in light of the foregoing disclosure. Therefore, the scope of the present invention should be interpreted solely from the following claims, as such claims are read in light of the disclosure.

What is claimed is:

1. In combination an acoustic logging tool and γ-ray tool, the combination comprising:

a γ-ray sensor to measure γ radiation from the environment;

an acoustic transmitter;

a first acoustic sensor;

a second acoustic sensor;

electronic equipment operatively associated with the γ-ray sensor and with the acoustic transmitter and with the first and second acoustic sensors;

a tubular elongated interior steel housing having an exterior surface and enclosing an interior space, and an exterior housing, the exterior housing comprising a plurality of sections, all sections jointly forming the exterior housing having an exterior surface and, a first one of said sections including a plurality of openings, a second section of the exterior housing comprising material that is non-conductive of acoustic energy, a third section of the exterior housing comprising material that is non-conductive of acoustic energy, each one of said sections enclosing a corresponding portion of the interior housing with an annular space being provided between each section and a portion of the interior housing, a first corresponding portion of the interior housing having placed in its tubular interior the γ-ray sensor and being surrounded by the first section of the exterior housing, a second portion of the interior housing having a layer of lead tightly bonded on its exterior surface and being surrounded by the second section of the exterior housing, a third portion of the interior housing having a layer of lead tightly bonded on its exterior surface and being surrounded by the third section of the exterior housing, the second acoustic sensor being mounted to the interior steel housing between the first and the second portions of the interior housing, the first acoustic sensor being mounted to the interior steel housing between the second and third portions of the interior housing, the acoustic transmitter being mounted to the interior steel housing below the third portion of the interior housing, the electronic equipment being mounted within the interior space of the interior housing, including the interior space of the second and third portions of the interior housing and within the interior space of the interior housing at the locations of at least one of the first acoustic sensor, the second acoustic sensor and the acoustic transmitter.

2. The combination of acoustic logging tool and γ-ray tool of claim 1 wherein electronic equipment is mounted within the interior space of the interior housing at the locations of the first acoustic sensor, the second acoustic sensor and the acoustic transmitter.

3. The combination of acoustic logging tool and γ-ray tool of claim 1 having an overall length that does not exceed approximately 8½ feet.

4. The combination of acoustic logging tool and γ-ray tool of claim 2 having an overall length that does not exceed approximately 8½ feet.

5. The combination of acoustic logging tool and γ-ray tool of claim 1 wherein the second and third sections of the exterior housing consist essentially of fiberglass.

6. The combination of acoustic logging tool and γ-ray tool of claim 2 wherein the second and third sections of the exterior housing consist essentially of fiberglass.

7. The combination of acoustic logging tool and γ-ray tool of claim 6 wherein oil is contained in the annular space between the second section of the exterior housing and the lead-covered second portion of the interior housing and in the annular space between the third section of the exterior housing and the lead-covered third portion of the interior housing.

8. The combination of acoustic logging tool and γ-ray tool of claim 2 wherein the second and third sections of the exterior housing consist essentially of polytetrafluoroethylene (TEFLON®).

9. The combination of acoustic logging tool and γ-ray tool of claim 8 wherein oil is contained in the annular space between the second section of the exterior housing and the lead-covered second portion of the interior housing and in the annular space between the third section of the exterior housing and the lead-covered third portion of the interior housing.

10. The combination of acoustic logging tool and γ-ray tool of claim 2 wherein the exterior housing comprises a fourth section of solid steel placed around a corresponding portion on said interior housing, said fourth section being adjacent to the first section that includes a plurality of openings, an annular space formed between the fourth section and the corresponding portion of said interior housing containing an oil, and a pressure compensating piston that separates the annular space containing oil from the space that is open to the environment due to openings in the first section.

11. The combination of acoustic logging tool and γ-ray tool of claim 2 wherein the exterior housing comprises a fifth section of solid steel, said fifth section being adjacent to the third section.

12. The combination of acoustic logging tool and γ-ray tool of claim 1 further comprising a top sub-assembly affixed to the tool above the first section.

13. The combination of acoustic logging tool and γ-ray tool of claim 1 further comprising a bottom sub-assembly affixed to the tool below the third section.

14. In a combination of an acoustic logging tool and γ-ray tool, the combination including an external housing, a γ-ray sensor to measure γ radiation from the environment, an acoustic transmitter, a first acoustic sensor, a second acoustic sensor, a set of electronic equipment operatively associated with the γ-ray sensor, with the acoustic transmitter and with the first and second acoustic sensors, the γ-ray sensor, the acoustic transmitter, the first and second acoustic sensors and the associated electronic equipment being affixed to an elongated interior steel housing, the transmitter and the first and second sensors being located at fixed linear distances from one another along the interior steel housing, the improvement comprising:

a layer of lead tightly bonded on the exterior of the portion of the interior steel housing which separates the transmitter from the first sensor, and a layer of lead tightly bonded on the exterior of the portion of the interior steel housing which separates the first sensor from the second sensor, said lead-covered portions of the interior steel housing acting as sound isolator bars, and external housing sections surrounding the lead-covered portions of the steel housing, said housing sections substantially consisting of sound insulating materials, the improvement further being in that electronic equipment is mounted within the interior space of the lead-covered portions of the interior housing and within the interior space of the interior housing at the locations of at least one of the first acoustic sensor, the second acoustic sensor and the acoustic transmitter.

15. The improvement of claim 14 wherein electronic equipment is mounted within the interior space of the interior housing at the locations of the first acoustic sensor, the second acoustic sensor and the acoustic transmitter.

16. The improvement of claim 15 wherein the over all length of the combination does not exceed approximately 8½ feet.

17. The improvement of claim 15 wherein annular spaces between the external housing sections and the lead-covered portions of the interior housing are filled with an oil.

18. The improvement of claim 17 wherein the external housing sections surrounding the lead-covered portions of the interior housing consist essentially of fiberglass.

19. The improvement of claim 17 wherein the external housing sections surrounding the lead-covered portions of the interior housing consist essentially of polytetrafluoroethylene (TEFLON®).

20. In a combination of an acoustic logging tool and γ-ray tool, the combination including an external housing, a γ-ray sensor to measure γ radiation from the environment, an acoustic transmitter, a first acoustic sensor, a second acoustic sensor, a set of electronic equipment operatively associated with the γ-ray sensor, with the acoustic transmitter and with the first and second acoustic sensors, the γ-ray sensor, the acoustic transmitter, the first and second acoustic sensors and the associated electronic equipment being affixed to an elongated interior steel housing having a first portion and a second portion, the transmitter and the first and second sensors being located at fixed linear distances from one another along the interior steel housing, the improvement comprising:

a layer of lead tightly bonded on the exterior of the first portion of the interior steel housing which separates the transmitter from the first sensor, and a layer of lead tightly bonded on the exterior of the second portion of the interior steel housing which separates the first sensor from the second sensor, said lead-covered portions of the interior steel housing acting as sound isolator bars, and external housing sections surrounding the lead-covered portions of the steel housing, said housing sections substantially consisting of sound insulating materials, the improvement further being in that electronic equipment is mounted within the interior space of the lead-covered portions of the interior housing and within the interior space of the interior housing at the locations of the first acoustic sensor, the second acoustic sensor and the acoustic transmitter whereby the over all length of the combination does not exceed approximately 8½ feet.

\* \* \* \* \*